(12) United States Patent
Cunningham

(10) Patent No.: US 11,934,973 B2
(45) Date of Patent: *Mar. 19, 2024

(54) METHODS AND SYSTEMS FOR DETERMINING ALTERNATIVE PLANS

(71) Applicant: Capital One Services, LLC, McLean, VA (US)

(72) Inventor: Sarah Cunningham, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,735

(22) Filed: Mar. 16, 2023

(65) Prior Publication Data

US 2023/0222399 A1    Jul. 13, 2023

Related U.S. Application Data

(63) Continuation of application No. 16/909,763, filed on Jun. 23, 2020, now Pat. No. 11,620,588.

(51) Int. Cl.
G06Q 10/02     (2012.01)
G06N 20/00     (2019.01)
G06Q 30/0201   (2023.01)

(52) U.S. Cl.
CPC ........... *G06Q 10/025* (2013.01); *G06N 20/00* (2019.01); *G06Q 30/0201* (2013.01)

(58) Field of Classification Search
CPC .. G06Q 10/025; G06Q 30/0201; G06N 20/00; G06N 3/044; G06N 3/045
See application file for complete search history.

(56) References Cited

U.S. PATENT DOCUMENTS

| | | | |
|---|---|---|---|
| 8,694,456 B2 | 4/2014 | Grigg et al. | |
| 10,535,052 B2 | 1/2020 | Tavares et al. | |
| 11,120,349 B1* | 9/2021 | Wu | ........................ G06Q 10/04 |
| 11,763,370 B2* | 9/2023 | Fredrich | ............ G06Q 30/0625 |
| | | | 705/26.7 |
| 2016/0071197 A1* | 3/2016 | Elsworth | ............ G06Q 30/0224 |
| | | | 705/14.25 |
| 2021/0073671 A1* | 3/2021 | Puri | ......................... G06N 5/04 |
| 2021/0110352 A1* | 4/2021 | Dunne | ............... G06Q 10/1093 |

FOREIGN PATENT DOCUMENTS

| | | | | |
|---|---|---|---|---|
| WO | 2019177620 A1 | 9/2019 | | |
| WO | WO-2019177620 A1 * | 9/2019 | ............... | B62H 3/00 |

* cited by examiner

*Primary Examiner* — Farid Seyedvosoghi
(74) *Attorney, Agent, or Firm* — Bookoff McAndrews, PLLC

(57) ABSTRACT

A computer-implemented method for determining alternative plans for a user may include: determining an event status of an event based on one or more parameters, wherein the event status comprises a target event indicator, wherein the one or more parameters comprise event population; obtaining event data of a target event; obtaining transactional data of the user, wherein the transactional data includes transaction time and transaction location; determining, via one or more processors, a likelihood of a potential transaction of the user associated with the target event by processing the transactional data and the event data using a trained machine learning model; and transmitting, to the user, a notification based on the determined likelihood of the potential transaction, wherein the notification includes a suggestion for alternative travel plans of the user.

20 Claims, 4 Drawing Sheets

METHODS AND SYSTEMS FOR DETERMINING ALTERNATIVE PLANS

CROSS-REFERENCE TO RELATED APPLICATION(S)

This patent application is a continuation of, and claims the benefit of priority to, U.S. Nonprovisional patent application Ser. No. 16/909,763, filed on Jun. 23, 2020, the entirety of which is incorporated herein by reference.

TECHNICAL FIELD

Various embodiments of the present disclosure relate generally to analysis of transactional history of a user (e.g., a customer), and, more particularly, to determining alternative plans for the user.

BACKGROUND

Large events (e.g., concerts, performances, sporting events, festivals, parades, civic gatherings, etc.), if unknown in advance, may negatively impact a user. Indeed, such events may draw large crowds, increase traffic, and/or result in long lines at merchant sites and the like within the vicinity of the event. Many times, a user is only informed of such events by continuously checking available news, websites, or other public information sources, thereby often leaving the user insufficiently informed of real-time user-specific impacts caused by such events.

The present disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining alternative plans for a user.

In an aspect, a computer-implemented method for determining alternative plans for a user may include: determining an event status of an event based on one or more parameters, wherein the event status comprises a target event indicator, wherein the one or more parameters comprise event population; obtaining event data of a target event; obtaining transactional data of the user, wherein the transactional data includes transaction time and transaction location; determining, via one or more processors, a likelihood of a potential transaction of the user associated with the target event by processing the transactional data and the event data using a trained machine learning model; and transmitting, to the user, a notification based on the determined likelihood of the potential transaction, wherein the notification includes a suggestion for alternative travel plans of the user, and wherein the alternative travel plans include at least one of a suggestion for the user to travel to an alternative location different than the transaction location or a suggestion for the user to travel at an alternative time different than the transaction time.

In another aspect, a computer-implemented method for determining alternative plans for a user may include: determining an event status of an event based on one or more parameters, wherein the event status comprises a target event indicator, wherein the one or more parameters comprise event population; obtaining event data of a target event, wherein the event data includes event time and event location; obtaining transactional data of the user, wherein the transactional data includes transaction time and transaction location; determining, via one or more processors, a degree of similarity between the event data and the transactional data, wherein the determining the degree of similarity includes comparing the event time to the transaction time and comparing the event location to the transaction location; determining, via the one or more processors, a likelihood of a potential transaction of the user associated with the target event based on the determined degree of similarity using a trained machine learning model; and transmitting, to the user, a notification based on the determined likelihood of the potential transaction, wherein the notification includes a suggestion for alternative travel plans of the user, and wherein the alternative travel plans include at least one of a suggestion for the user to travel to an alternative location different than the transaction location or a suggestion for the user to travel at an alternative time different than the transaction time.

In yet another aspect, a computer system for determining alternative plans for a user may include a memory storing instructions and one or more processors configured to execute the instructions to perform operations. The operations may include: determining an event status of an event based on one or more parameters, wherein the event status comprises a target event indicator, wherein the one or more parameters comprise event population; obtaining event data of a target event; obtaining transactional data of the user, wherein the transactional data includes transaction time and transaction location; determining a likelihood of a potential transaction of the user associated with the target event by processing the transactional data and the event data using a trained machine learning model; and transmitting, to the user, a notification based on the determined likelihood of the potential transaction, wherein the notification includes a suggestion for alternative travel plans of the user, and wherein the alternative travel plans include at least one of a suggestion for the user to travel to an alternative location different than the transaction location or a suggestion for the user to travel at an alternative time different than the transaction time.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as event data and transactional data may be used to determine a degree of similarity between the event data and transactional data. This degree of similarity may be used to determine a likelihood of a potential transaction of a user associated with a target event, and subsequently used to determine one or more alternative plans for a user.

Figure 1:
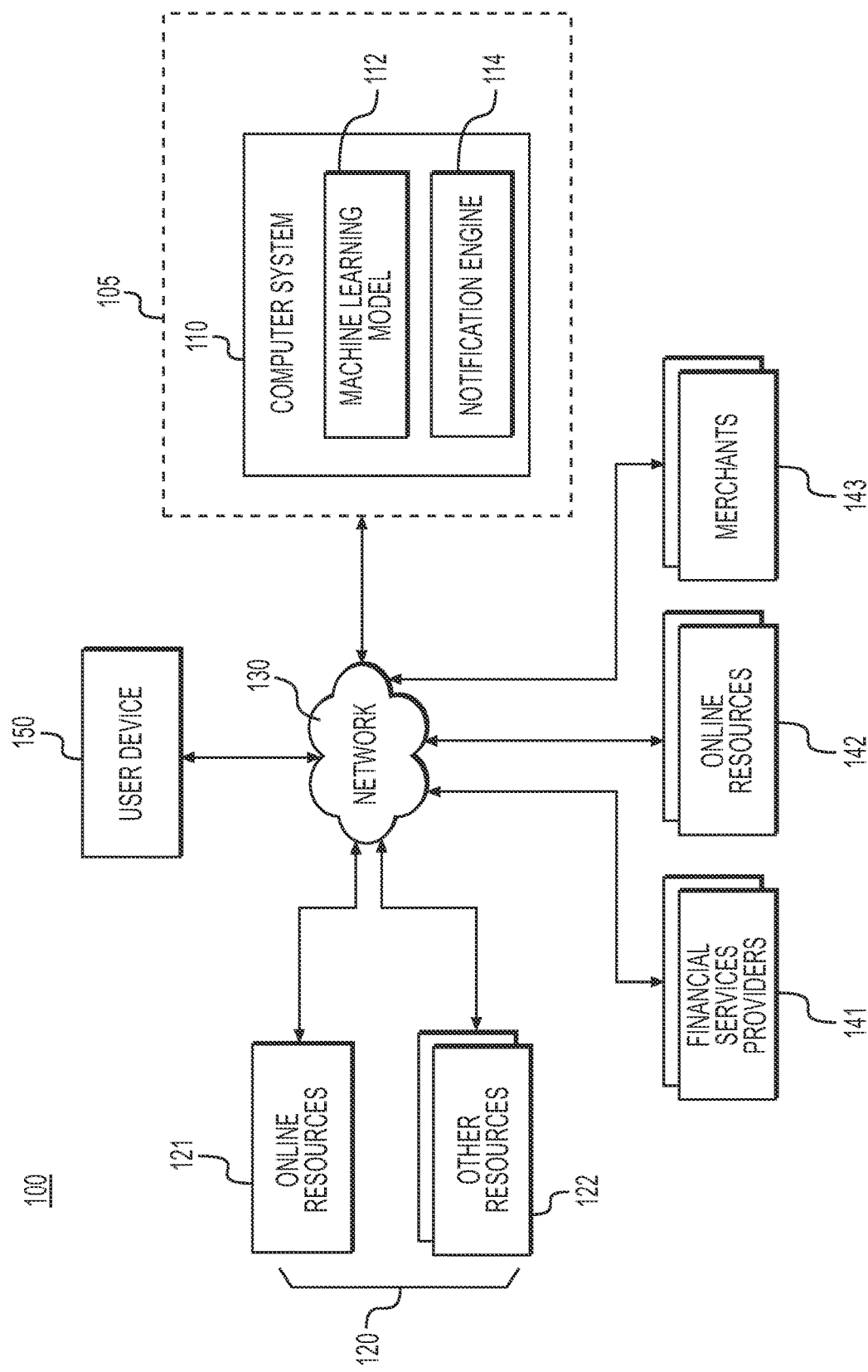
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, one or more resources for collecting event data 120, a network 130, one or more resources for collecting transactional data 141-143, and a user device 150. The one or more resources for collecting transactional data may include financial services providers 141, online resources 142, and merchants 143. These components may be connected to one another via the network 130.

The computer system 110 may have one or more processors configured to perform methods described in this disclosure. The computer system 110 may include a machine learning model 112 and a notification engine 114, which may each be software components stored in the computer system 110. The computer system 110 may be configured to utilize the machine learning model 112 and/or notification engine 114 when performing various methods described in this disclosure. Machine learning model 112 may be a plurality of machine learning models. Details of machine learning model 112 are described elsewhere herein. In some examples, the computer system 110 may have a cloud computing platform with scalable resources for computation and/or data storage, and may run one or more applications on the cloud computing platform to perform various computer-implemented methods described in this disclosure.

Computer system 110 may be configured to receive data from other components (e.g., one or more resources for collecting event data 120, financial services providers 141, online resources 142, and/or merchants 143) of the system environment 100 through network 130. Computer system 110 may further be configured to utilize the received data by inputting the received data into the machine learning model 112 to produce a result. Information indicating the result may be transmitted to a user device 150 over the network 130. In some examples, the computer system 110 may be referred to as a server system that provides a service including providing the information indicating the result to a user device 150. The computer system 110 may comprise other components that facilitate the operation of various execution modules (not shown). These modules may include, for example, interface/API modules, a user identifier module, a purchase history module, a transaction tracker module, or an event tracker module. The interface/API modules may provide a web interface, an API, or another type of interface facilitating access by the user. The user identifier module may be configured to perform an identification or authentication process disclosed elsewhere herein. The purchase history module may be configured to retrieve, store, and/or manage past transactional data for a plurality of users. The transaction tracker module may be configured to retrieve, store, and/or manage current or future transactional data for a plurality of users. The event tracker module may be configured to retrieve, store, and/or manage past and current event data for a plurality of events or target events.

The one or more resources for collecting event data 120 may include one or more online resources 121. The one or more online resources 121 may include webpages, e-mails, or social networking sites. The one or more resources for collecting event data 120 also may include other resources 122 other than the one or more online resources 121. The other resources 122 may include newspaper, magazines, billboards, or phone calls. Information provided by other resources 122 may be captured by one or more electronic devices in communication with the network 130.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. The network 130 may be configured to provide communication between various components depicted in FIG. 1. The network 130 may comprise one or more networks that connect devices and/or components in the network layout to allow communication between the devices and/or components. For example, the network 130 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, the network 130 may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some examples, financial services providers 141 may include one or more merchant services providers that provide merchants 143 with the ability to accept electronic payments, such as payments using credit cards and debit cards. Therefore, financial services providers 141 may collect and store transactional data pertaining to transactions occurring at the merchants 143.

Online resources 142 for providing transactional data may include webpage, e-mail, apps, or social networking sites. For example, online resources 142 may include electronic transaction data (e.g., receipts) held by a user or other parties. Online resources 142 may be provided by manufacturers, retailers, consumer promotion agencies, and other entities. Online resources 142 may include other computer systems, such as web servers, that are accessible by computer system 110.

Merchants 143 may each be an entity that provides products. In this disclosure, the term "product," in the context of products offered by a merchant, encompasses both goods and services, as well as products that are a combination of goods and services. A merchant may be, for example, a retailer, a grocery store, an entertainment venue, a service provider, a restaurant, a bar, a non-profit organization, or other type of entity that provides products that a consumer may consume. A merchant 143 may have one or more venues that a consumer physically visits in order to obtain the products (goods or services) offered by the merchant 143.

The merchants 143 and financial services providers 141 may each include one or more computer systems configured to gather, process, transmit, and/or receive data. In general, whenever any of the merchants 143 and financial services providers 141 is described as performing an operation of gathering, processing, transmitting, or receiving data, it is understand that such operation may be performed by a computer system thereof. In general, a computer system may include one or more computing devices, as described with reference to FIG. 4 below.

User device 150 may operate a client program, also referred to as a user application, used to communicate with the computer system 110. This user application may be used to provide information to the computer system 110 and to receive information from the computer system 110. In some examples, the user application may be a mobile application that is run on the user device 150. The user device 150 may be a mobile device (e.g., smartphone, tablet, pager, personal digital assistant (PDA)), a computer (e.g., laptop computer, desktop computer, server), or a wearable device (e.g., smartwatches). A user device 150 can also include any other media content player, for example, a set-top box, a television set, a video game system, or any electronic device capable of providing or rendering data. The user device 150 may optionally be portable. The user device 150 may be handheld. The user device 150 may be a network device capable of connecting to a network, such as the network 130, or other networks such as a local area network (LAN), wide area network (WAN) such as the Internet, a telecommunications network, a data network, or any other type of network. The user device 150 may be capable of transmitting information indicating a current location of the user device 150. For example, a user device 150 may have an application configured to transmit data indicating a current location of the user device 150 to computer system 110. The user device 150 may determine location based on data obtained by a GPS included in the user device 150 and/or other location estimation techniques.

Computer system 110 may be part of entity 105, which may be any type of company, organization, or institution. In some examples, the entity 105 may be a financial services provider. In such examples, the computer system 110 may have access to data pertaining to consumer transactions through a private network within the entity 105. For example if the entity 105 is a card issuer, entity 105 may collect and store transactions involving a credit card or debit card issued by the entity 105. In such examples, the computer system 110 may still receive transactional data from other financial services providers 141.

Figure 2:
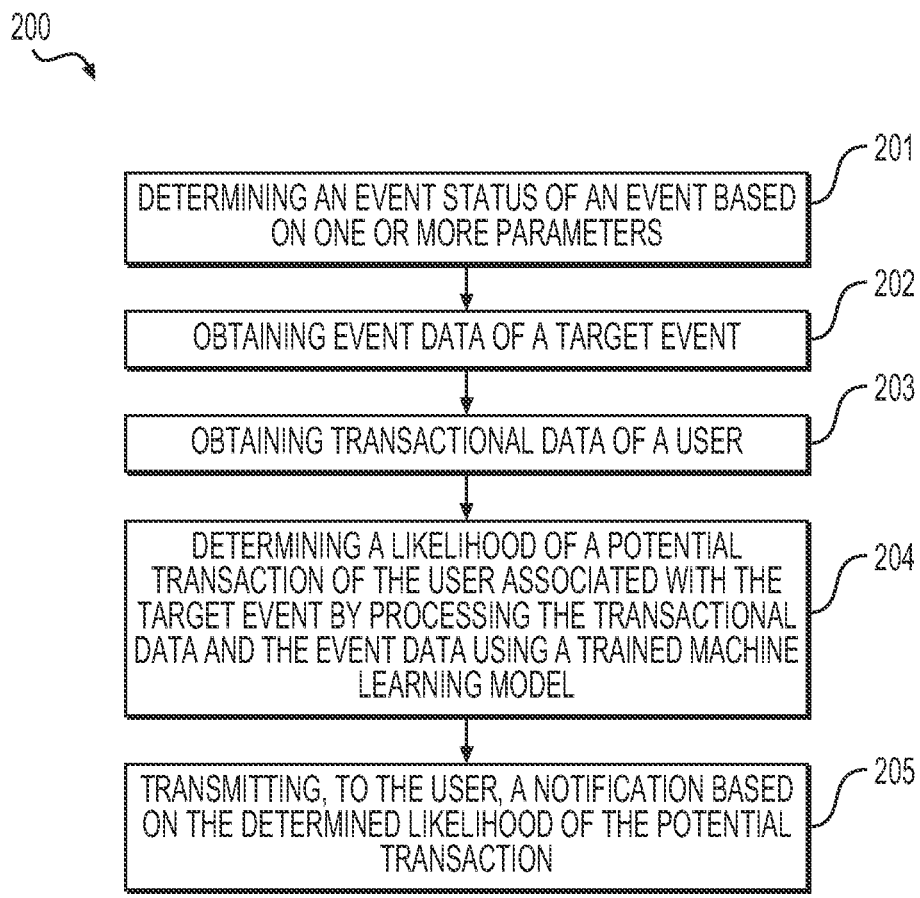
FIG. 2 depicts a flowchart of an exemplary method of determining alternative plans for a user, according to one or more embodiments.

FIG. 2 is a flowchart illustrating a method for determining alternative plans for a user, according to one or more embodiments of the present disclosure. The method may be performed by computer system 110.

Step 201 may include determining an event status of an event based on one or more parameters. The event status may include a target event indicator (e.g., an indication as to whether an event is a target event). The one or more parameters may include event population, event revenue, event sponsorship, and/or event history. One or more algorithms may be utilized to determine if an event is a target event. For instance, a functional relationship may exist between the event population and whether an event is a target event. In this situation, if the event population is above a predetermined threshold, then the event is a target event. One or more algorithms may include a trained machine learning model, as described elsewhere herein.

Step 202 may include obtaining event data of a target event. The target event may include a concert, a marathon, a music festival, a parade, a conference, a trade show, or any other gatherings. The obtaining event data of the target event may include obtaining the event data of the target event from one or more online resources 121 or other resources 122. The one or more online resources 121 or other resources 122 may provide event data for each event when such event is announced publically, or may collect data for multiple events and transfer the data periodically or according to a predetermined schedule.

Step 203 may include obtaining transactional data of a user. The transactional data may include, a customer name and/or identifier, contact information (e.g., address, phone numbers, e-mail addresses, etc.), demographic information (e.g., age, gender, marital status, income level, educational background, number of children in household, etc.), user preferences (preferences or reviews regarding favorite products and/or services, favorite department stores, etc.), and previous transaction information. The previous transaction information may include a time of a transaction, a location of a transaction, spending profile of a user, past spending levels on goods/services sold by various manufacturers or merchants, a frequency of shopping by the user at one or more retail outlets, store loyalty exhibited by the user, how much the user spends in an average transaction, how much the user has spent on a particular collection/category, how often the user shops in a particular store or kind of store, an estimated profit margin on goods previously purchased, distances the user has traveled to purchase products in past outings, or online or offline stores at which the user has purchased items.

The obtaining the transactional data of the user may include obtaining the transactional data of the user from a transactional entity over a network. The transactional entity may include one or more merchants 143, financial services providers 142, or online resources 143. For instance, the computer system 110 may obtain transactional data indicating payment transactions involving financial services providers 141 over a financial network. If the entity 105 operating the computer system 110 is a card issuer or other financial services provider that is involved in processing payment transactions, the computer system 110 may have access to such transactional data directly or through a private network within entity 105, and may utilize such information in addition to or alternatively to information from other financial services providers 141.

Step 204 may include determining a likelihood of a potential transaction of the user associated with the target event by processing the transactional data and the event data using a trained machine learning model 112. The likelihood may be represented as a probability that a user may perform the potential transaction at a geographic region and time range that the target event takes place. The machine learning model 112 may be a regression-based model that accepts the data identified in steps 202 and/or 203 as input data. The machine learning model 112 may be of any suitable form, and may include, for example, a neural network. The machine learning model 112 may compute the likelihood of a potential transaction as a function of transactional data, event data, and one or more variables indicated in the input data. Details of trained machine learning model 112 are further described elsewhere herein.

Prior to step 204, or at any stage of determining alternative plans for a user, there may be a step of identifying a geographic location of the user and comparing the geographic location of the user with a geographic location of the target event (e.g., event location) to determine whether the geographic location of the user is within a predetermined distance of the geographic location of the target event. The identifying the geographic location of the user may include identifying the geographic location of the user via a user device associated with the user (e.g., user device 150). The user device 150 may include memory storage that stores a user's geographic location, for example, periodically. The geographic location of the user may include a location that the user visits or stays regularly. Such a geographic location may include, for instance, a residence location, an employment location, a fitness center, a coffee shop, a library, a restaurant, or a shopping destination location associated with the user. The geographic location of the target event may be an address or a geographic region at which the target event takes place. The predetermined distance between the geographic location of the user and the geographic location of the target event may be at least 1 mile, 5 miles, 10 miles, 15 miles, 20 miles, 25 miles, 30 miles, 35 miles, 40 miles, or more. In some other embodiments, the predetermined distance may be at most 40 miles, 35 miles, 30 miles, 25 miles, 20 miles, 15 miles, 10 miles, 5 miles, or less. In one example, the predetermined distance is 10 miles.

Step 205 may include transmitting, to the user, a notification based on the determined likelihood of the potential transaction. The notification may include information associated with alternative plans for a user. The notification may be configured to be displayed on a display screen of a user device associated with the user (e.g., user device 150). The notification may be displayed on the display screen in any suitable form, such as an e-mail, a text message, a push notification, content on a web page, and/or any form of graphical user interface. The user device 150 may be capable of accepting inputs of a user via one or more interactive components of the user device 150, such as a keyboard, button, mouse, touchscreen, touchpad, joystick, trackball, camera, microphone, or motion sensor. In some examples, step 205 may occur in response to a trigger condition. For example, the notification engine 114 may detect a trigger condition that a determined likelihood of a potential transaction of the user is higher than a predetermined threshold value, and then transmit information regarding alternative plans to the user device 150. The predetermined threshold value may be at least 10%, 20%, 30%, 40%, 50%, 60%, 70%, 80%, 90% or more. In other embodiments, the predetermined threshold value may be at most 90%, 80%, 70%, 60%, 50%, 40%, 30%, 20%, 10% or less.

The notification may include a suggestion for alternative travel plans of the user. The alternative travel plans may include at least one of a suggestion for the user to travel to an alternative location different than the transaction location, or a suggestion for the user to travel at an alternative time different than the transaction time. For instance, if a target event takes place during a Wednesday night at a museum, and there is a high likelihood that a user performs a potential transaction geographically close to the museum during that Wednesday night, the alternative travel plans may include suggestions that the user performs the potential transaction Tuesday night and/or the user travels to somewhere remote from the museum Wednesday night. The alternative travel plans may include driving directions. For instance, if a target event is a parade, the alternative travel plans may include driving directions to avoid the parade route if a user decides to travel at the time of the parade. The alternative travel plans may include a suggestion for the user to complete a transaction online. For instance, if a user only has time to go grocery shopping at a certain grocery store during a specific time, and a target event takes place at the grocery store or within a specified distance of the grocery store during the specific time, then the alternative travel plans may include suggestions that the user may try to buy products online and have the products delivered.

Figure 3:
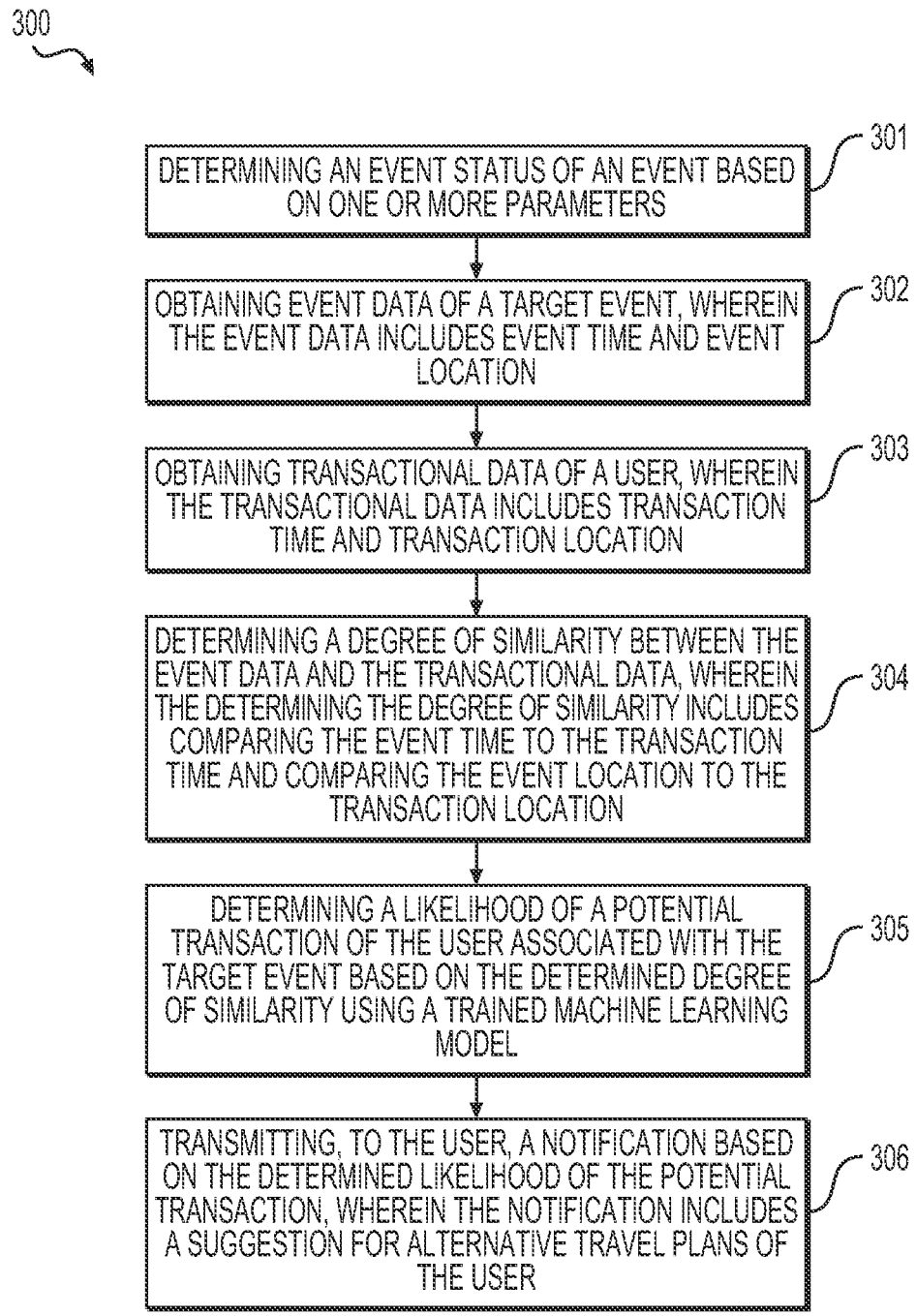
FIG. 3 depicts a flowchart of another exemplary method of determining alternative plans for a user, according to one or more embodiments.

FIG. 3 is a flowchart illustrating another exemplary method for determining alternative plans for a user, according to one or more embodiments of the present disclosure. The method may be performed by computer system 110.

Step 301 may be similar to step 201, which includes determining an event status of an event based on one or more parameters. The event status may include a target event indicator (e.g., indicative of whether an event is a target event). The one or more parameters may include an event population, an event revenue, an event sponsorship, and/or an event history. One or more algorithms may be utilized to determine if an event is a target event. For instance, a functional relationship may exist between the event population and whether an event is a target event. In this situation, if the event population is above a predetermined threshold, then the event is a target event. One or more algorithms may include a trained machine learning model 112, as described elsewhere herein.

Step 302 may be similar to step 202, which includes obtaining event data of a target event. The event data may include event time and event location. The event time may include a time range initiating before a start time of the target event and terminating after an end time of the target event. For example, if a target event starts at 8:00 pm central time (CT) and ends at 11:00 pm CT, the event time may include a time range from 6:00 pm CT to 1:00 am CT. The event location may include a geographic region surrounding the target event. For instance, if the target event takes place at a specific address (e.g., a stadium), the event location may be within a radius around the specific address. In another example, if the target event takes place in a larger geographic area (e.g., a parade), the event location may be within a radius around the center of the larger geographic area.

Step 303 may be similar to step 203, which includes obtaining transactional data of a user. The transactional data may include a transaction time and a transaction location.

The transaction time may include a time range initiating before a start time of the transaction and terminating after an end time of the transaction. For example, if a user goes to a grocery store at 7:00 pm central time (CT) and leaves the grocery store at 8:00 pm CT on a specific day every week, the transaction time may include a time range from 6:00 pm CT to 9:00 pm CT on that specific day every week. The transaction location may include a geographic region surrounding the transaction. For instance, if the transaction takes place at a specific address (e.g., a grocery store), the transaction location may be within a radius around the specific address. The transaction location may include a geographic region that a user travels to perform a transaction. For instance, a user may go to work in the morning, go to gym after work, go to a grocery store after the gym, and go back home after grocery shopping. In this situation, the transaction location may be considered the geographic area encompassed within a radius around the center of the user's residence, gym, employer location, and/or grocery store.

Step 304 may include determining, via one or more processors, a degree of similarity between the event data and the transactional data, wherein the determining the degree of similarity includes comparing the event time to the transaction time and comparing the event location to the transaction location. One or more algorithms may be used to compare the event time to the transaction time and/or compare the event location to the transaction location. The degree of similarity may indicate a level of overlap or proximity between the event data and the transactional data. In a first scenario in which the event time and transaction time overlap, and the event location and transaction location overlap, the degree of similarity may be relatively high (e.g., equal to or exceeding a predetermined threshold of similarity). In a second scenario in which the event time and transaction time may not overlap but are close to each other, and the event location and transaction location overlap, then the degree of similarity may be lower than the degree of similarity in the first scenario. The degree of similarity may include statistical measurements, such as Gaussian similarities.

Step 305 may include determining, via the one or more processors, a likelihood of a potential transaction of the user associated with the target event based on the determined degree of similarity using a trained machine learning model 112 or other statistically based algorithms. The likelihood of the potential transaction of the user associated with the target event may also be determined based on transactional data, event data, and/or the determined degree of similarity. The machine learning model 112 may be a regression-based model that accepts the data identified in steps 301, 302, 303, and/or 304 as input data. The machine learning model 112 may be of any suitable form, and may include, for example, a neural network. A neural network may be software representing human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include a convolutional neural network, a deep neural network, or a recurrent neural network.

The machine learning model 112 may compute the likelihood of a potential transaction as a function of the determined degree of similarity and one or more variables indicated in the input data. The one or more variables may be derived from transactional data and/or event data. This function may be learned by training the machine learning model 112 with training sets. In some examples, the computer system 110 or machine learning model 112 may automatically select a plurality of target events. In such examples, the machine learning model 112 may compute a respective likelihood of a potential transaction for each of the plurality of target events.

The machine learning model 112 may be trained by supervised, unsupervised or semi-supervised learning using training sets comprising data of types similar to the type of data used as the model input. For example, the training set used to train the model 112 may include any combination of the following: transactional data of a user; data associated with transactions performed by customers other than the user; event data of a target event; data associated with one or more characteristics of events other than the target event; or data associated with characteristics of a geographic region of the target event. The characteristics of a geographic region of the target event may include urbanization classification of the location (e.g., urban, suburban, or rural); the types of land use or land development in the location (e.g., corporate, residential, commercial, cultural, institutional, entertainment, or mixed use);

and/or any other characteristic of economic environments, such as population density, demographic characteristics, climate, etc. Accordingly, the machine learning model 112 may be trained to map input variables to a quantity or value of a likelihood of a potential transaction of the user associated with the target event. That is, the machine learning model 112 may be trained to determine a quantity or value of a likelihood of a potential transaction of the user as a function of various input variables. Such input variables may include the event location, event time, transaction time, transaction location, and a degree of similarity between event data and transactional data. The likelihood of a potential transaction of the user determined by the machine learning model 112 may be used as an additional input variable.

The trained machine learning model 112 may utilize principal component analysis (PCA). The PCA may convert a set of variables or input data into a set of values of linearly uncorrelated variables, which include a first principal component that has the largest possible variance. For example, the input data, including the event time, event location, transaction time, transaction location, and degree of similarity, may be converted to a set of variables representing other characteristics of the target event and the transactions performed by the user. The other characteristics of the target event and the transactions performed by the user may include event population, event revenue, products involved in the transactions, or costs of transactions. The PCA may be used to define one or more variables that are more important than other variables, or reduce the number of variables needed to be trained and computed by a machine learning model 112.

Step 306 may be similar to step 205, which includes transmitting, to the user, a notification based on the determined likelihood of the potential transaction. The notification may include a suggestion for alternative travel plans of the user. The alternative travel plans may include at least one of a suggestion for the user to travel to an alternative location different than the transaction location, or a suggestion for the user to travel at an alternative time different than the transaction time. For instance, if a target event takes place during a Wednesday night at a museum, and there is a high likelihood that a user performs a potential transaction geographically close (e.g., within a predetermined distance) to the museum during that Wednesday night, the alternative travel plans may include suggestions that the user performs the potential transaction Tuesday night or that the user travels to somewhere remote from the museum Wednesday night. The alternative travel plans may include driving directions. For instance, if a target event is a parade, the alternative travel plans may include driving directions to avoid the parade route if a user decides to travel at the time of the parade. The alternative travel plans may include a suggestion for the user to complete a transaction online. For instance, if a user only has time to go grocery shopping at a certain grocery store during a specific time, and a target event takes place at the grocery store or within a specified distance of the grocery store during the specific time, then the alternative travel plans may include suggestions that the user may try to buy products online and have the products delivered.

In general, any process discussed in this disclosure that is understood to be computer-implementable, such as the processes illustrated in FIGS. 2-3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 4:
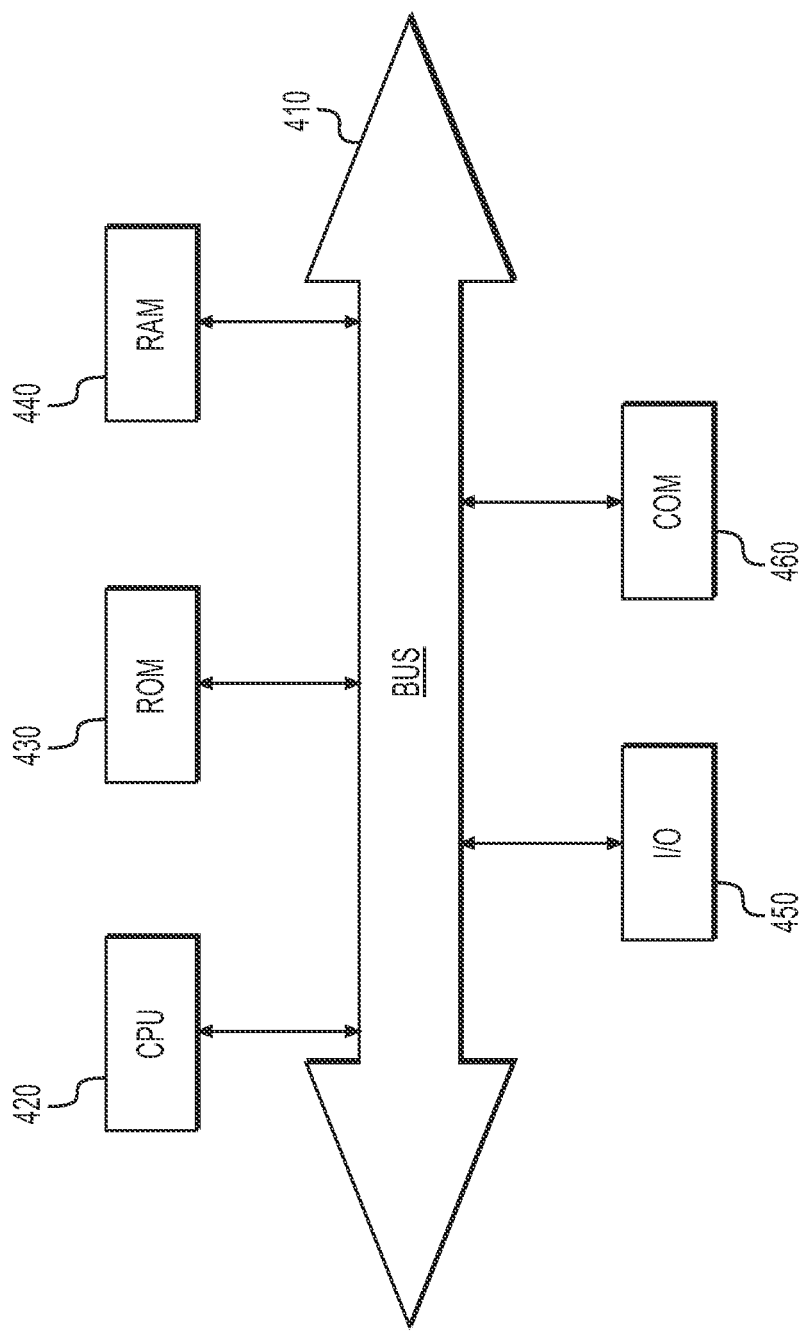
FIG. 4 depicts an example of a computing device, according to one or more embodiments.

FIG. 4 illustrates an example of a computing device 400 of a computer system, such as computer system 110. The computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for determining alternative plans for a user, the method comprising:
 determining an event status of an event based on one or more parameters;
 obtaining event data of a target event;
 obtaining prior transactional location data of the user;

determining, via one or more processors, a likelihood of a potential transaction of the user associated with the target event by processing the prior transactional location data and the event data using a trained machine learning model; and transmitting, to the user, a notification based on the determined likelihood of the potential transaction, wherein the notification includes alternative travel plans of the user.

2. The method of claim 1, wherein the obtaining the event data of the target event includes obtaining the event data of the target event from one or more online resources.

3. The method of claim 1, wherein the obtaining the transactional location data of the user includes obtaining the transactional location data of the user from a transactional entity over a network.

4. The method of claim 3, wherein the transactional entity includes one or more merchants, financial services providers, or online resources.

5. The method of claim 1, further including:
identifying a geographic location of the user; and
comparing the geographic location of the user with a geographic location of the target event to determine whether the geographic location of the user is within a predetermined distance of the geographic location of the target event.

6. The method of claim 5, wherein the identifying the geographic location of the user includes identifying the geographic location of the user via a user device associated with the user.

7. The method of claim 5, wherein the geographic location of the user includes a residence location, an employment location, or a shopping destination location associated with the user.

8. The method of claim 5, wherein the predetermined distance is 10 miles.

9. The method of claim 1, wherein the notification is configured to be displayed on a display screen of a user device associated with the user.

10. A computer-implemented method for determining alternative plans for a user, the method comprising:
determining an event status of an event based on one or more parameters;
obtaining event data of a target event;
obtaining prior transactional location and time data of the user;
determining, via one or more processors, a degree of similarity between the event data and the prior transactional location and time data;
determining, via the one or more processors, a likelihood of a potential transaction of the user associated with the target event based on the determined degree of similarity; and
transmitting, to the user, a notification based on the determined likelihood of the potential transaction, wherein the notification includes alternative travel plans of the user.

11. The method of claim 10, further including:
identifying a geographic location of the user; and
comparing the geographic location of the user with an event location of the target event to determine whether the geographic location of the user is within a predetermined distance of the event location of the target event.

12. The method of claim 11, wherein the identifying the geographic location of the user includes identifying the geographic location of the user via a user device associated with the user.

13. The method of claim 11, wherein the geographic location of the user includes a residence location, an employment location, or a shopping destination location associated with the user.

14. The method of claim 10, wherein the target event comprises an event time including a time range initiating before a start time of the target event and terminating after an end time of the target event.

15. The method of claim 10, wherein the target event comprises an event location including a geographic region surrounding the target event.

16. The method of claim 10, wherein the alternative travel plans include driving directions.

17. The method of claim 10, wherein the alternative travel plans include a suggestion for the user to complete a transaction online.

18. The method of claim 10, wherein determining a likelihood of a potential transaction includes a trained machine learning model utilizing principal component analysis.

19. The method of claim 10, wherein the notification is configured to be displayed on a display screen of a user device associated with the user.

20. A computer system for determining alternative plans for a user, comprising:
a memory storing instructions; and
one or more processors configured to execute the instructions to perform operations including:
determining an event status of an event based on one or more parameters;
obtaining event data of a target event;
obtaining prior transactional location and time data of the user;
determining, via one or more processors, a likelihood of a potential transaction of the user associated with the target event by processing the prior transactional location and time data and the event data using a trained machine learning model; and
transmitting, to the user, a notification based on the determined likelihood of the potential transaction, wherein the notification includes alternative travel plans of the user.

* * * * *